United States Patent [19]
Bacher et al.

[11] Patent Number: 5,882,558
[45] Date of Patent: Mar. 16, 1999

[54] PROCESS AND APPARATUS FOR RECYCLING OF SYNTHETIC PLASTICS MATERIAL CONTAINING GAS

[75] Inventors: Helmut Bacher; Helmuth Schulz, both of St. Florian; Georg Wendelin, Linz, all of Austria

[73] Assignee: Sunpor Technology A/S, Norway

[21] Appl. No.: 758,214

[22] PCT Filed: Apr. 26, 1993

[86] PCT No.: PCT/AT93/00073

§ 371 Date: Aug. 19, 1994

§ 102(e) Date: Aug. 19, 1994

[87] PCT Pub. No.: WO93/22119

PCT Pub. Date: Nov. 11, 1993

Related U.S. Application Data

[63] Continuation of Ser. No. 290,982, Aug. 19, 1994, abandoned.

[30] Foreign Application Priority Data

Apr. 30, 1992 [AT] Austria ......................................... 894/92

[51] Int. Cl.$^6$ .................................................. B29C 47/92
[52] U.S. Cl. ......................... 264/40.4; 264/102; 264/916; 425/143; 425/145; 425/289
[58] Field of Search ........................... 264/40.4, DIG. 69, 264/102, 916; 425/4 C, 145, 812, 289, 208, 143

[56] References Cited

U.S. PATENT DOCUMENTS

| | | | |
|---|---|---|---|
| 3,344,212 | 9/1967 | Francis | 425/378.1 |
| 3,535,408 | 10/1970 | Ronden | 264/37 |
| 3,723,582 | 3/1973 | Winstead | 264/53 |
| 3,787,160 | 1/1974 | Leister | 425/208 |
| 3,883,624 | 5/1975 | McKenzie et al. | 264/37 |
| 4,063,860 | 12/1977 | Cushing | 264/DIG. 69 |
| 4,246,211 | 1/1981 | Kuhnel | 264/37 |
| 4,448,737 | 5/1984 | Johnson | 264/53 |
| 4,613,471 | 9/1986 | Harris | 264/40.4 |
| 4,666,646 | 5/1987 | Chang | 264/DIG. 69 |
| 5,217,660 | 6/1993 | Howard | 264/37 |
| 5,251,824 | 10/1993 | Adelmann | 241/3 |
| 5,424,013 | 6/1995 | Lieberman | 264/DIG. 69 |
| 5,480,597 | 1/1996 | Ishida et al. | 264/40.4 |

FOREIGN PATENT DOCUMENTS 73000545  2/1973  Japan .

*Primary Examiner*—Allan R. Kuhns
*Attorney, Agent, or Firm*—Salter & Michaelson

[57] ABSTRACT

In a process for recycling of gas-containing synthetic plastics material, this material at first is comminuted, molten, degased and filtered. The degased synthetic plastics material is supplied in the same plant before its solidification for gas introduction, and in order to homogenize the gas content, the gas amount introduced into the synthetic plastics material per time unit is controlled in dependence from the synthetic plastics material amount supplied per time unit to the gas introduction, and preferably the pressure of the synthetic plastics material to which gas is to be added, is kept almost constant. The apparatus suitable for performing this process comprises an extruder (12,13) for plasticizing and degasing the synthetic plastics material, the outlet (15) thereof is connected by means of at least one line (16) to a mixer (25), to which also a device (29) for supplying gas is connected. A melt pump (23) for the synthetic plastics material is inserted into the line (16) and the amount of melt delivered by this pump is used as a command variable for the gas supply, for which a device (29) is provided that is controlled by a control unit (22) proportional to the speed of the melt pump (23) (FIG. 1).

19 Claims, 2 Drawing Sheets

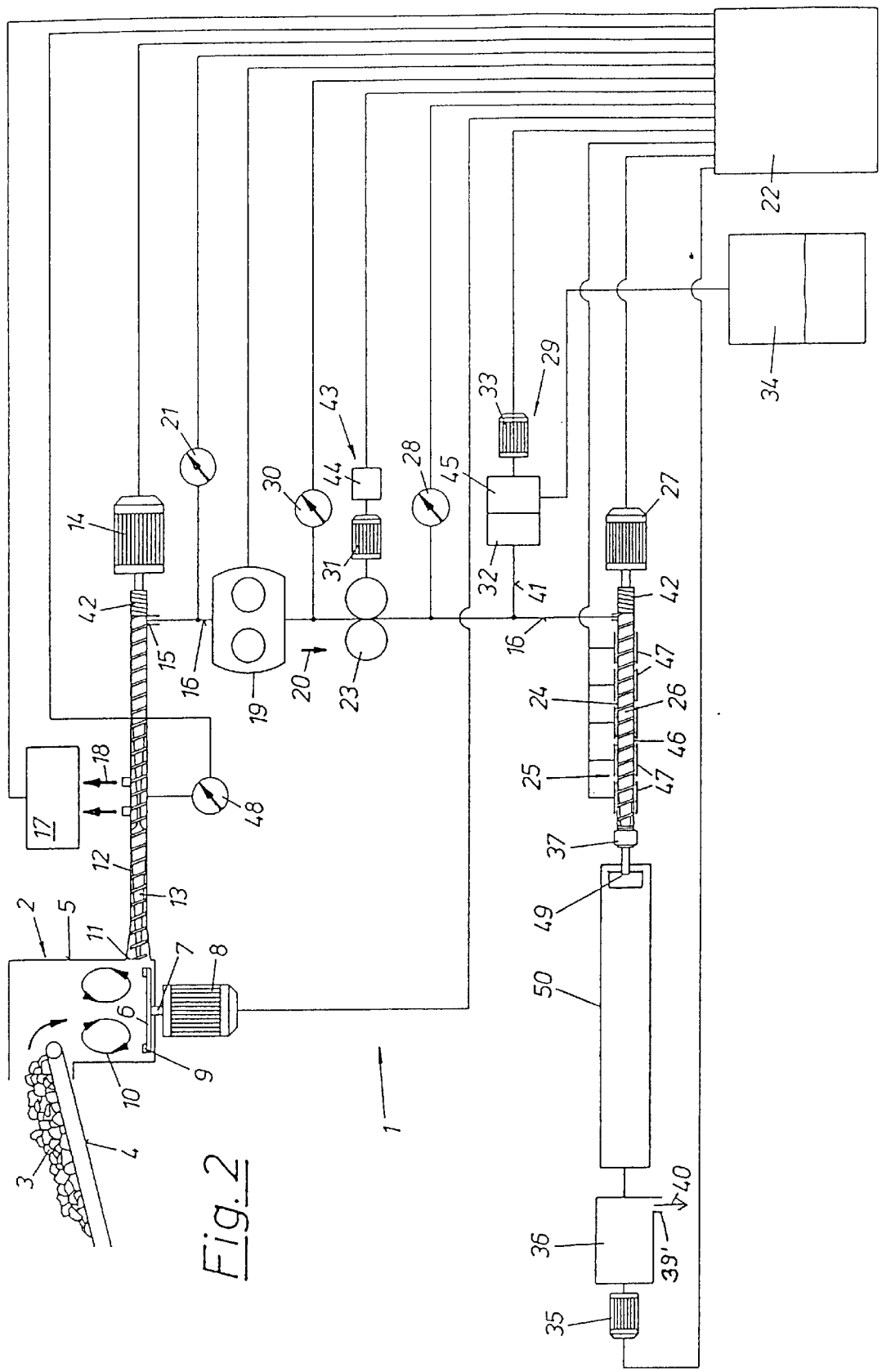

PROCESS AND APPARATUS FOR RECYCLING OF SYNTHETIC PLASTICS MATERIAL CONTAINING GAS

This application is a continuation of U.S. patent application Ser. No. 08/290,982, filed on Aug. 19, 1994, now abandoned.

BACKGROUND AND SUMMARY OF THE INVENTION

The invention relates to a process for recycling of synthetic plastics material containing gas, for example foamed polystyrene, in a plant in which synthetic plastics material is molten, filtered, degased, granulated and mixed with gas again, this gas re-introduction being performed in the same plant as the granulation. Further, the invention relates to an apparatus for performing such a process.

The usual process steps when re-introducing gas into foamed synthetic plastics material, in particular polystyrene, consist in that the synthetic plastics material is comminuted in a tearing and densifying apparatus and is then plasticized in an extruder and de-gased. The so produced plasticized, de-gased synthetic plastics material is worked up to granules in a granulating apparatus and is solidified thereby. The granulate forms a pourable homogeneous, de-gased mass which then is introduced again into an extruder and is molten therein. During the extrusion which can be performed by means of extruders comprising one or more extruder screw, a gas is fed in a controlled manner to the extruder wherein gas is introduced within the extruder into the synthetic plastics melt and is homogenized therewith, considering the necessary holding time in the extruder. When doing this, the use of a pourable homogeneous granulate is compulsory necessary because only in such a manner a continuous flow of the melt in the extruder and therefore a continuous filling degree of the foaming gas in the melt can be ensured.

A similar process has become known from the document "Plastver-arbeiter", volume 42, 1991, number 6, pages 124, 125. This document suggests to mill packages of polystyrene and subsequently to heat this material in a roller extruder so that the material is de-gased and plasticized. The thus obtained solidified final product, namely cristallized polystyrene, is then foamed again in an oxtruder.

These known processes have the disadvantage that two melting steps are necessary which, as a rule, have to be carried out at different places, because the homogeneous introduction of the gas is a critical thing and, therefore, cannot be made everywhere. Therefore, as a rule, the synthetic plastics material to be recycled is granulated there where an apparatus for comminuting and densifying the material is at disposal. The granulate is then sent to a plant where the material is provided with a gas content again. This involves costs for transport and transformation which lead to a high price of the recycled and gas-containing material so that the thus obtained recycling product can hardly be sold. The consequence is an environmental load by foamed synthetic plastics material scrap or by improper processed synthetic plastics material. In this connection it is of detrimental influence that in the past frequently such gases have been used as foaming gases (for example fluorocarbons) which are critical for environmental reasons and, therefore, should not get into the atmosphere.

It is also known to melt and degas scraps of foamed thermoplastic synthetic plastics material in an extruder comprising several worms. In parallel to this extruder a further extruder is provided in which thermoplastic particles, hence new material, are molten and mixed with gas. The outlets of the two extruders are combined to a mixing and cooling station to which a further extruder as well as a mould are connected, in which the material is foamed. Finally, the foamed material is cut to the desired shape or is granulated. For performing this process, a considerable effort in apparatus and space is required and the above described disadvantages can not fully be avoided by this process, because the granulate of new material must at first be produced and then be stored so that the enthalpy is lost which was in the new material until its granulation.

The invention has as its object to improve a process of the last described kind so that the recycling process of the gas-containing synthetic plastics material can be effected quicker, simpler and requiring considerably less effort in apparatus and space and without environmental load and without the use of new material. The invention solves this task in that the gas is fed to that synthetic plastics material which was de-gased and this before its granulation in such plasticized condition of the synthetic plastics material which originates from the melting process and the degasing step, and that for homogenisation of the gas content the gas volume introduced per time unit into the synthetic plastics material and the mixture volume processed per time unit by the mixer are controlled proportionally to the synthetic plastics material volume supplied per time unit to the gas-introduction step. For performing the inventive process, therefore, only one single plant is required and comminuting, plasticising, filtering, re-gasing and solidifying of the processed synthetic plastics material can be effected at the same place and, therefore, avoiding transport costs. Within this, the known tearing and comminuting apparatus can be used, which must only be provided with a device for the introduction of the gas and with a device for the subsequent mixing and solidifying, in order to be able to perform the inventive process. The plant expenses required for this are comparatively low and amortize already within a short time by the saved transport costs and charge fees for the extraneous device for re-introduction of the gas. The quality of the obtained final product is good, also with respect to homogenity of the foaming gas content, what is obtained by the inventive control of the gas introduction in dependence from the amount of flow of the synthetic plastics material supplied to the gas introduction step. A further advantage of the inventive process consists in that the processed synthetic plastics material must be molten one single time only so that the second melting process required hereuntofore can be saved. This means also, that the synthetic plastics material is treated more gently because each melting process is combined with the danger of a reduction of the molecule chain length of the synthetic plastics material. Further, when performing the inventive process, the synthetic plastics material must be solidified one single time only, and this—in contradiction to the initially described known processes—after introduction of the gas only.

In contradiction to the last described known process, within the inventive process only such synthetic plastics material is processed which was subjected to the recycling process. Therefore, the use of new material and therefore the expenses for material, transport, storage and melting connected therewith can be saved. Further, the inventive process requires substantially less effort in apparatus, when compared with the known processes.

The invention considers also that the synthetic plastics material subjected to the recycling process is not always of the same quality, in particular with respect to the specific weight or, respectively, to the foaming degree. The invention considers that, when material of lower weight (higher foaming degree) is processed, the output of the apparatus used for the melting process will decrease. As a consequence thereof, the synthetic plastics material amount supplied per time unit to the gas introduction step, decreases. If this volume measured per time unit is used in the sense of the invention as the command variable for the gas amount used per time unit for being added to the synthetic plastics material, the gas content for the final recycling product remains at least substantially constant with what is desired with respect to the further processing of this final product. The homogenity of this final product is also enhanced by the proportional readjustment of the mixture amount worked up per time unit by the mixer, in dependence from the mentioned command variable, because undermixing as well as overmixing are avoided and thus the cell structure of the regenerate obtained as the final product is kept at least substantially constant.

Since as a rule it is desired to operate the plant with an output as high as possible or, respectively, as far as possible to fully utilize the capacity of the present plant, according to a preferred embodiment of the inventive process, the volume of the synthetic plastics material supplied per time unit to the gas introduction step is kept within a predetermined interval, preferably near the maximum capacity of the plant used. This can easily be obtained by operating the plant elements used for plasticizing and de-gasing of the supplied synthetic plastics material quicker or, respectively, with an increased output.

As a rule, a pump for the synthetic plastics material flow supplied to the gas introduction step is inserted between those plant elements that serve for plasticizing the supplied synthetic plastics material, and those plant elements that serve for the re-introduction of the gas. According to a preferred embodiment of the inventive process, the supplied synthetic plastics material is comminuted and then is plasticized and de-gased by means of a screw, that the so obtained de-gased melt is supplied by means of a melt pump, preferably a gear pump, to a mixer to which also the gas used is supplied, and that the synthetic plastics material amount delivered per time unit by the melt pump is measured and is used as the command variable for the gas supply, and that the pressure of the synthetic plastics material on the suction side of the melt pump is measured and is kept by varying the speed of the melt pump and/or the speed of the worm within a predetermined interval, preferably at a value that is as constant as possible. Therefore, the melt pressure before the melt pump is kept almost constant by adjusting the delivery of the plasticizing screw or the melt pump, and by proportional readjustment of the gas supply in dependence on the delivery per time unit of the melt pump used as the command variable, the desired constant gas content in the final product produced by the mixer is obtained. Keeping the pressure of the material supplied to the melt pump within a predetermined interval ensures that the melt pump does not make idle strokes, and that therefore the volume delivered is exactly proportional to the run of the melt pump, in particular to the speed of the gear pump. Further, in such a manner the plant can easily be operated near its maximum capacity.

Within the spirit of the invention, it is particularly favourable to add the gas to the flow of the synthetic plastics material already before its introduction into the mixer, in order to obtain a certain mixture between the synthetic plastics material and the foaming gas already before the synthetic plastics material or, respectively, the gas enters the mixer.

For a uniform absorption of the gas, the melt pressure behind the melt pump is of importance. According to a further embodiment of the invention, therefore, the process is conducted so that when the pressure of the synthetic plastics material melt supplied by the melt pump deviates from a predetermined desired value, the viscosity of the mixture prepared by the mixer is correspondingly changed by cooling and/or heating, preferably until the desired value is reached.

As a rule, pentane is used for the gas that is again introduced. In order to avoid an explosion in the plant section behind the degasing step, within the spirit of the invention the vacuum is controlled that is used for degasing the synthetic plastics material.

The inventive apparatus for performing the inventive process starts from a plant having a comminuting means for the synthetic plastics material to be processed, to which means a motor-driven screw for plasticizing this material is connected, a de-gasing means for the synthetic plastics material being related to that screw. Starting therefrom, the inventive apparatus is characterized in that the outlet of the screw is connected by means of at least one line to a mixer to which also a device for supplying gas is connected, and that to at least one of these lines a device for measuring the synthetic plastics material amount flowing per time unit in this line is connected, which device is connected to a control unit for the gas supply to the mixer and for the speed of the motor of the screw. In such a manner the inventive process can be performed with low constructional effort. Since, however, the pressure in the outlet of the screw and, therefore, in the line leading to the mixer alone will frequently not be sufficiently high in order to reliably supply the plasticized synthetic plastics material into the mixer, according to a preferred embodiment of the inventive apparatus, a melt pump, in particular a gear pump, for supplying the synthetic plastics material melt is inserted into the line leading from the screw to the mixer, a measuring device for the speed of this melt pump being provided, noting that to this line a pressure sensor for the pressure at the suction side of this melt pump is connected, which pressure sensor, as well as the measuring device, are connected to the control unit. The, suitably electronic, control unit calculates the measuring results obtained from the pressure sensor and from the measuring device and controls in correspondence to these measuring results the gas supply to the synthetic plastics material melt in such a manner that the gas content thereof is kept at least substantially constant so that a homogeneous final product is obtained.

BRIEF DESCRIPTION OF THE DRAWINGS

Further characteristics and advantages of the present invention can be seen from the description of two embodiments of the inventive apparatus which are schematically shown in the drawings wherein:

FIG. 2 is a schematic view of an apparatus of another preferred embodiment.

DETAILED DESCRIPTION OF THE PREFERRED EMBODIMENTS

Figure 1:
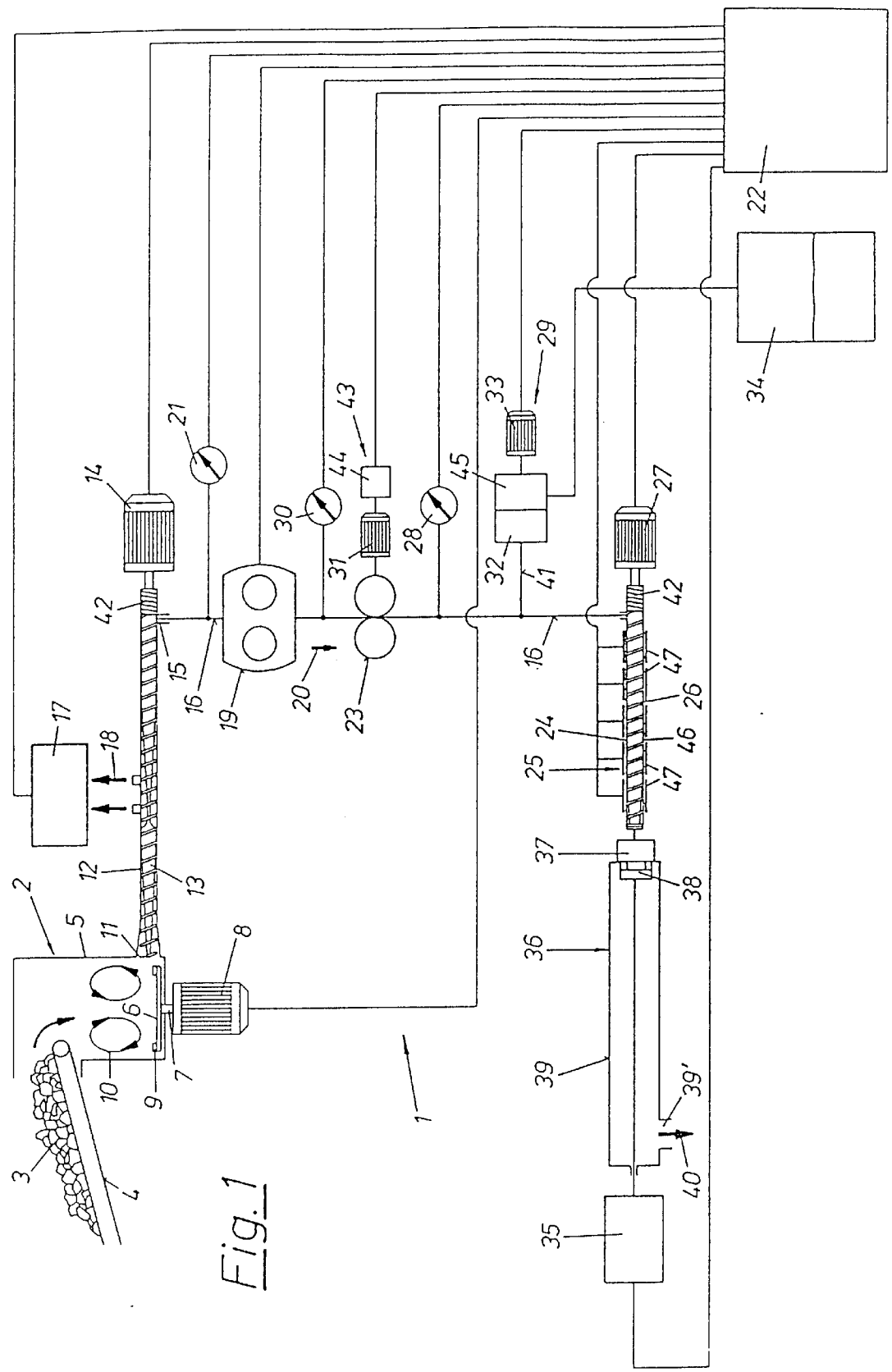
FIG. 1 is a schematic view of an apparatus of the present invention.

According to the embodiment of FIG. 1 the plant 1 for carrying out the process has a comminuting apparatus 2 formed by a tearing and condensing machine, to which the synthetic plastics material 3 to be recycled, in particular foamed polystyrene, for example STYROPOR (registered trademark) is supplied by means of a conveyor 4. The synthetic plastics material 3 falls from above into a receptacle 5 of the comminuting apparatus 2 and a tool 6 for comminuting and/or mixing of the synthetic plastics material 3 rotates in the bottom region of the comminuting apparatus 2 around a vertical axis 7, the tool 6 being driven by a motor 8. The tool 6 is provided with knives 9 acting on the synthetic plastics material 3, which knives comminute and mix the material 3 which rotates in the receptacle 5 in form of a mixing thrombe 10. An outlet opening 11 is disposed in the sidewall of the receptacle 5 at the level of the tool 6, to which opening the housing 12 of a screw 13 is connected in radial direction. The screw is driven for rotation by a motor 14 disposed at that end of the screw which does not face the receptacle 5. By means of the screw 13 the synthetic plastics material supplied from the receptacle 5 is plasticized and is pressed in plasticized or molten condition at the outlet 15 of the housing 12 into a line 16. The housing 12 is further provided with lateral openings through which gases carried along by the melt conveyed by the worm 13 can escape into a degasing device 17 via one or more lines 18. Suitably, these gases are collected, cleaned (if necessary) and supplied to a recycling process.

At least one filter means 19 is inserted into the line 16 by which filter the synthetic plastics material melt is freed from impurities carried along. In front of the filter 19, when seen in flowing direction of the synthetic plastics material melt (arrow 20), a pressure sensor 21 is connected to the line 16, which sensor is also connected to a control unit 22 by which the entire plant 1 is monitored and is controlled in the sense of an optimal operation condition. To this control unit 22 also the motor 14 is connected. A melt pump 23 formed by a gear pump is inserted into the line 16 behind the filter 19, which pump is driven by a motor 31 and supplies the synthetic plastics material through the line 16 into the housing 24 of a mixer 25 which may be formed by a static or dynamic mixer. The embodiment illustrated shows a dynamic mixer which comprises a mixing element, for example a mixing worm 26 bearingly supported for rotation within a housing 24 and driven for rotation by a motor 27. Instead of such a dynamic mixer also a static mixer can be used which comprises baffles in the housing 24 by which the supplied synthetic plastics material is mixed. In the mixer 25 also the gas is introduced again into the synthetic plastics material or is worked up into this plasticized or melt-like synthetic plastics material, which constitutes an intermediate product only and is directly supplied by the pump 23 to the mixer 25 without adding any gas-containing synthetic plastics material or new synthetic plastics material. For this, a further pressure sensor 28 and a means 29 for the addition of gas to the synthetic plastics material melt are connected to the line 16 between the melt pump 23 and the mixer 25. A further pressure sensor 30 is connected to the line 16 between the filter 19 and the pump 23. The means 29 for supplying gas has a proportioning device 32 comprising a pump for the propelling gas to be added to the synthetic plastics material melt, which proportioning device 32 is driven by a motor 33 and is supplied with a foam producing gas or "foaming agent", for example pentane which is liquid at atmospheric pressure, from a foaming gas source 34. All these motors 14, 27, 31, 33 as well as the pressure sensors 21, 28, 30 and the filter 19 are connected to the control unit 22. Further, a motor 35 for a granulating means 36 is connected to this control unit 22, to which granulating means the synthetic plastics material to be granulated is supplied from the mixer 25 via an extruder head 37. Before the extruder head 37 rotates at least one knife 38 driven by a motor 35 and the cut-off synthetic plastics material particles gather within a granulator housing 39 where they are cooled and conveyed off through an outlet 39' in direction of the arrow 40.

The synthetic plastics material to be provided with gas again is supplied exclusively from the extruder formed by the housing 12 and the screw 13, however, of course a plurality of such extruders may in common be connected to the line 16. Therefore, no addition of new material takes place to that synthetic plastics material which is conveyed by the screw 13 into the line 16, unless new material together with other synthetic plastics material is conveyed by the conveyor 4 into the comminuting means 2. The latter may be the case if scraps obtained from the production of new foamed synthetic plastics material are processed, for example rests of foamed synthetic plastics material blocks or the like.

The entire plant 1 is controlled by the control means 22 so that the filling degree of the foaming gas in the synthetic plastics material granulate that is conveyed off through the outlet 39' remains at least substantially constant, even if the quality of the synthetic plastics material 3 supplied by the conveyor 4 changes. For this, the plant comprises a device 43 for measuring the synthetic plastics material amount flowing per time unit in the line 16, which device 43 is connected to the control unit 22. Since the pressure sensor 30 and the control unit 22 ensure that the pressure of the synthetic plastics material supplied to the gear pump 23 via the line 16 is kept within a predetermined pressure interval so that the gear pump 23 is always completely filled, however also an unstable compression of the synthetic plastics material is avoided, the synthetic plastics material mass conveyed by the gear pump 23 is proportional to the speed of revolution of the gear pump 23. In the simpliest case, this speed can be measured by means of a revolution counter 44 forming the means 43 and can be transmitted to the control means 22. In order to consider also changes of the quality of the synthetic plastics material supplied to the entire plant 1, the pressure sensor 30 is provided which senses the pressure in front of the gear pump 23. Thus, if for example the screw 13 forming an extruder takes up synthetic plastics material 3 of lower weight (material having a higher foaming degree), the synthetic plastics material mass delivered per time unit through the outlet 15 into the line 16 decreases. As a consequence, also the pressure in front of the gear pump 23 will decrease what is transmitted to the control unit 22 by the pressure sensor 30. The control unit causes that the screw 13 is driven quicker by the motor 14 and/or that the melt pump 23 is driven by the motor 31 with a reduced speed. If the speed of the gear pump 23 is changed, the revolution counter 44 of the means 43 causes the control unit 22 at the same time to proportionally adjust a gas pump 45 provided in the dosing device 32. In order to keep the pressure in front of the gear pump 23 sensed by the pressure sensor 30—as mentioned above—within a predetermined interval so that it is avoided that the spacewidths of the gear pump 23 are not completely filled with synthetic plastics material or that the synthetic plastics material is additionally compressed by the melt pump 23, mainly the operational speed of the plasticizing screw 13 is correspondingly controlled via the control unit 22 by controlling the speed of the motor 14. In addition thereto—in particular if the mentioned speed control of the motor 14 should not be sufficient—also the speed of the motor 31 of the gear pump may be controlled correspondingly by the control unit 22. This causes that the flow delivered per time unit by the gear pump 23 is changed what is transmitted via the revolution counter 44 to the control unit 22 which causes a corresponding proportional control of the gas dosing in the device 29, for example in a simple manner by controlling the operational speed of the gas pump 45 by means of the motor 33. Further, the delivery pressure of the gear pump 23 is measured by the pressure sensor 28 connected to the line 16 behind the gear pump 23. Since this pressure is of importance for the gas take up of the melt, the control unit 22 keeps this pressure as constant as possible. For this, at first the motor 27 of the mixer is so influenced by the control unit 22 that the mixer 25 takes up just that volume of the synthetic plastics material-gas-mixture that is supplied to it from the gear pump 23 or, respectively from the gas pump 45. In addition thereto, the resistance in the mixer 25 may be influenced by changing the viscosity of the synthetic plastics material within the mixer 25. For this, a plurality of heating zones or, respectively, cooling zones 47 are disposed on the periphery of the housing 46 of the mixer 25, which zones together build up a heating- and cooling-cascade control and may be switched in individually or in any desired combination by the control unit 22 in dependence of the constant pressure in that section of the line 16 that is disposed behind the gear pump 23, which pressure serves as a command variable.

As it is shown in the drawing, the line 41 via which the foaming gas is added to the melt, ends into the line 16 so that in that section of the line 16 that is disposed between the line 41 and the mixer 25, already a pre-mixing of the synthetic plastics material and the foaming gas takes place. However, the line 41 may also be connected directly to the housing of the mixer 25. Suitably, a non-return valve (not shown) is inserted into the line 41.

As it is further shown in the drawing, the two screws 13, 26 are provided on their ends facing the motors 14, 27 with volutions 42 conveying in inverse direction, so that a sealing for the driving shafts driven by the motors 14, 27 is formed.

The pressure sensor 21 serves for sensing the pressure of the synthetic plastics material melt directly at the outlet 15 and in front of the filter 19. Thereby, soiling of the filter 19 can be monitored and a screen exchange or screen backwashing step can be initiated in time, if the pressure in the line 16 in front of the filter 19 exceeds a predetermined value. These steps are also initiated by the control unit 22. Suitable filter means 19 which enable one to change a screen or to clean a screen, for example by backwashing, without substantial impairment of the synthetic plastics material pressure in the line 16 behind the filter 19, are known.

Of course it is also possible to connect more than one comminuting means 2 and extruders 12, 13 connected thereto by a plurality of lines 16 to a common mixer 25. In an analogous manner it would also be possible to connect one single extruder 12, 13 by means of a plurality of parallel lines 16 to the mixer 25.

It would also be possible to introduce the plasticized synthetic plastics material via the line 16 directly into the mixer 25, thus without that this material is conveyed by a melt pump 23. This, however, requires that the flow of the synthetic plastics material 16 in this line can be monitored in a suitable manner, for example by means of a usual flow meter. By the said reasons also the pressure in the line 16 must be monitored. Control of the gas supply or of the speed of the worm 13 or of the speed of the mixer 25 is done by the control unit 22 in an analogous manner to that described above.

Within the embodiment according to FIG. 2, a vacuum control means 48 is connected to the housing 12 of the worm 13, said means 48 transmits the measured vacuum to the control unit 22. Thereby the function of the degasing device 17 is monitored so that any danger of explosion of the pentane used for the gas addition is avoided. Further, the granulating device 36 is not directly connected to the granulating head 37 or its nozzle 49, but by intermediary insertion of a flow cooling device 50, in which the nozzle 49 is disposed. The synthetic plastics material cord produced by it is conveyed within a cooling bath in the cooling device 50 and enters the granulating device 36 only after having passed the flow cooling device 50, and in the granulating device 36 there are disposed rotating knives which cut the granulate particles in a well manner from the synthetic plastics material cord. The granulate leaves the granulating device 36 through the outlet 39' in direction of the arrow 40. Also the conditions within the flow cooling device 50 may be influenced by the control unit 22 in any desired manner.

We claim:

1. In a process for recycling of synthetic plastics material containing gas in which the synthetic plastics material to be recycled is molten and then is filtered, de-gassed and granulated, wherein the improvement comprises the steps of:

plasticizing and de-gassing the synthetic plastics material within a first housing containing a first screw-type means;

removing the de-gassed, plasticized synthetic plastics material from the first housing through an outlet;

introducing a foaming agent into the de-gassed, plasticized synthetic plastics material before the granulation and after the de-gassing step and after the removal of the material from the first housing;

mixing and homogenizing the de-gassed, plasticized synthetic plastics material with the foaming agent within a second housing containing a second screw-type means to produce a mixture thereof, the second housing and second screw-type means being separate from and operable independently of the first housing and screw-type means;

wherein for homogenization of the foaming agent content the volume of foaming agent introduced per time unit into the de-gassed, plasticized synthetic plastics material and the volume of the mixture processed per time unit are controlled proportionally to the synthetic plastics material volume supplied per time unit at the inroduction of the foaming agent; and finally only then extruding the mixture from the second housing and granulating the same.

2. Process according to claim 1, the volume of the synthetic plastics material supplied per time unit to the foaming agent introduction being kept within a predetermined interval.

3. Process according to claim 2, the volume of the synthetic plastics material supplied per time unit to the foaming agent introduction being kept near the maximum capacity of a plant in which the process is performed.

4. Process according to claim 1, the synthetic plastics material to be recycled being comminuted and then is plasticized and de-gassed by means of a screw, the so obtained melt being filtered and supplied by means of a melt pump to a mixer, to which also the foaming agent to be added is supplied, and the synthetic plastics material amount delivered per time unit by the melt pump being measured and used as the command variable for the foaming agent supply, and the pressure of the synthetic plastics material on the suction side of the melt pump being measured and kept by varying one of the speed of the melt pump and the speed of the screw within a predetermined interval.

5. Process according to claim 4, the pressure of the synthetic plastics material on the suction side of the melt pump being kept by varying one of the speed of the melt pump and the speed of the screw at a value that is substantially at a constant.

6. Process according to claim 4, the foaming agent being added to the flow of the synthetic plastics material already before its introduction into the mixer.

7. Process according to claim 4, when the pressure of the synthetic plastics material melt delivered by the melt pump deviates from a predetermined desired value, the viscosity of the mixture worked up by the mixer being correspondingly varied by cooling and/or heating until this desired value is reached.

8. Process according to claim 1, wherein a vacuum is used for de-gassing the synthetic plastics material, said vacuum being selectively controllable.

9. An apparatus for recycling synthetic plastics material comprising:

comminuting means for comminuting the synthetic plastics material to be recycled, said comminuting means being connected to at least one screw driven by a motor for plasticizing the material;

a de-gassing and filtering device for de-gassing and filtering the synthetic plastics material, the de-gassing and filtering device being related to said screw wherein the outlet of the screw only is connected by at least one line to a mixer to which also a device for introducing a foaming agent into the plasticized and filtered synthetic plastics material is connected; and a device for measuring the plasticized synthetic plastics material amount flowing per time unit being connected to said at least one line, which measuring device being connected with a control unit for the foaming agent supply to the mixer and for the speed of the motor of the screw, the mixer being connected to a granulation device for granulating the mixture of the plasticized synthetic plastics material and of the foaming agent.

10. Apparatus according to claim 9 further comprising:

a melt pump for supplying synthetic plastics material which is inserted into the line leading from the screw to the mixer;

a measuring device for measuring the speed of the melt pump being provided; and a pressure sensor for measuring the pressure on the suction side of this melt pump being connected to this line this pressure sensor and the measuring device being connected to the control unit.

11. Apparatus according to claim 10, said measuring device comprising a revolution speed meter.

12. Apparatus according to claim 9, the device for the foaming agent supply being connected by means of a line to the line supplying the synthetic plastics material to the mixer.

13. Apparatus according to claim 10, a filter of the de-gassing and filtering device being inserted before the melt pump.

14. Apparatus according to claim 13, a further pressure sensor being connected in front of the filter to the line supplying the synthetic plastics material to the melt pump, said pressure sensor further being connected to the control unit.

15. Apparatus according to claim 10, a pressure sensor for the pressure of the synthetic plastics material supplied from the melt pump to the mixer being connected to the line, said pressure sensor further being connected to the control unit.

16. Apparatus according to claim 15, the mixer being provided with at least one heating or cooling zone connected to the control unit.

17. Apparatus according to claim 9, a vacuum control device being connected to the housing of the screw in the region of the de-gassing device.

18. A process for recycling synthetic plastics material which contains gas, comprising the steps of:

(a) plasticizing the synthetic plastics material within a first housing containing a first screw-type means;

(b) de-gassing the synthetic plastics material within the first housing;

(c) removing the de-gassed, plasticized synthetic plastics material from the first housing through an outlet;

(d) filtering the synthetic plastics material;

(e) after said de-gassing and filtering, introducing a foaming agent into the thus obtained plasticized synthetic plastic material, said foaming agent being introduced into the synthetic plastics material as a liquid;

(f) introducing the de-gassed, filtered plasticized synthetic plastic material and foaming agent into a second housing containing a second screw-type means;

(g) mixing and homogenizing the de-gassed, filtered plasticized synthetic plastic material and foaming agent within the second housing;

(h) controlling the volume of the foaming agent introducing per time unit into the synthetic plastics material and the volume of said mixture processed per time unit so that these volumes are maintained at a predetermined proportion for homogenizing the foaming agent content in the mixture;

(i) extruding and granulating the mixture containing the foaming agent; and (j) wherein the introduction of the foaming agent being performed before granulating the mixture in a still plasticized condition of the synthetic plastics material originating from the plasticizing of this material and after the removal of the plasticized synthetic plastics material from the first housing.

19. A process for recycling synthetic plastics material which contains gas, comprising the steps of:

(a) plasticizing the synthetic plastics material within a first housing containing a first screw-type means;

(b) de-gassing the synthetic plastics material within the first housing;

(c) removing the de-gassed, plasticized synthetic plastics material from the first housing through an outlet;

(d) filtering the synthetic plastics material;

(e) after said de-gassing and filtering, introducing a foaming agent into the thus obtained plasticized synthetic plastic material, said foaming agent being introduced into the synthetic plastics material as a gas;

(f) introducing the de-gassed, filtered plasticized synthetic plastic material and foaming agent into a second housing containing a second screw-type means;

(g) mixing and homogenizing the de-gassed, filtered plasticized synthetic plastic material and foaming agent within the second housing;

(h) controlling the volume of the foaming agent introducing per time unit into the synthetic plastics material and the volume of said mixture processed per time unit so that these volumes are maintained at a predetermined proportion for homogenizing the foaming agent content in the mixture;

(i) extruding and granulating the mixture containing the foaming agent; and (j) wherein the introduction of the foaming agent being performed before granulating the mixture in a still plasticized condition of the synthetic plastics material originating from the plasticizing of this material and after the removal of the plasticized synthetic plastics material from the first housing.

* * * * *